May 18, 1954     R. E. PALMER     2,678,656
AUTOMATIC QUENCHING DEVICE
Filed Dec. 18, 1952     6 Sheets-Sheet 3

INVENTOR.
ROBERT E. PALMER
BY
Sanford Schnurmacher
ATTORNEY

May 18, 1954  R. E. PALMER  2,678,656
AUTOMATIC QUENCHING DEVICE
Filed Dec. 18, 1952  6 Sheets-Sheet 4

INVENTOR.
ROBERT E. PALMER
BY Sanford Schnurmacher
ATTORNEY

May 18, 1954 R. E. PALMER 2,678,656
AUTOMATIC QUENCHING DEVICE
Filed Dec. 18, 1952 6 Sheets-Sheet 5
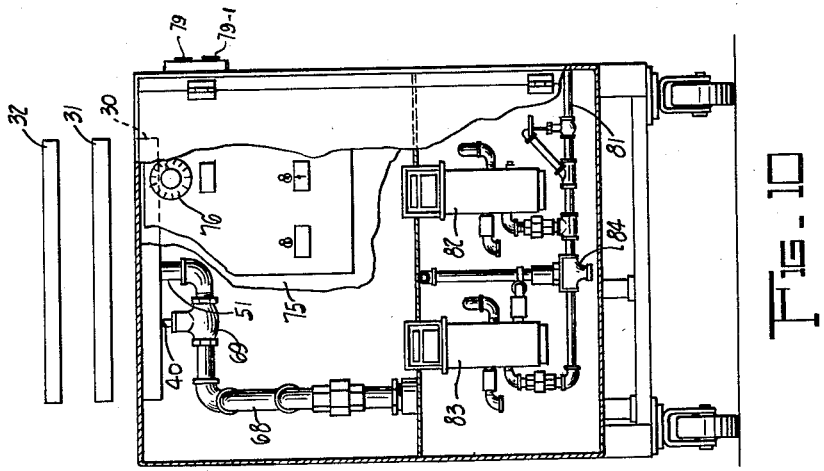
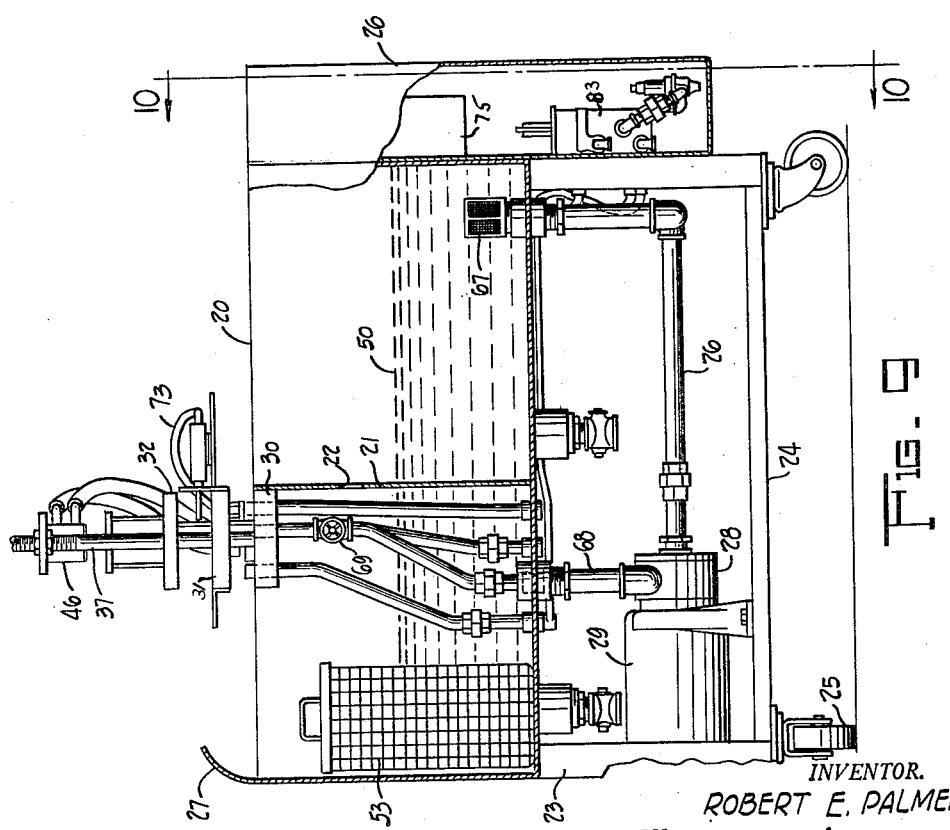
INVENTOR.
ROBERT E. PALMER
BY
Sanford Schnurmacher
ATTORNEY

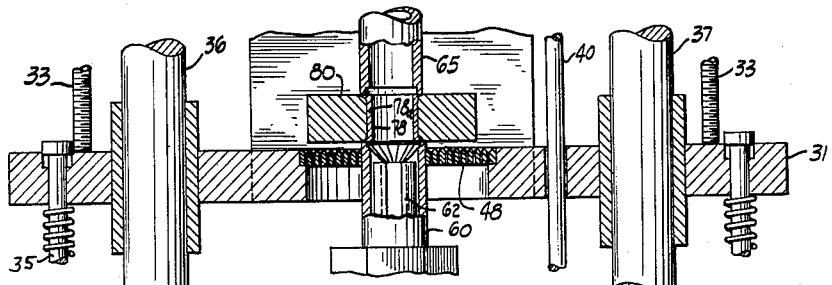
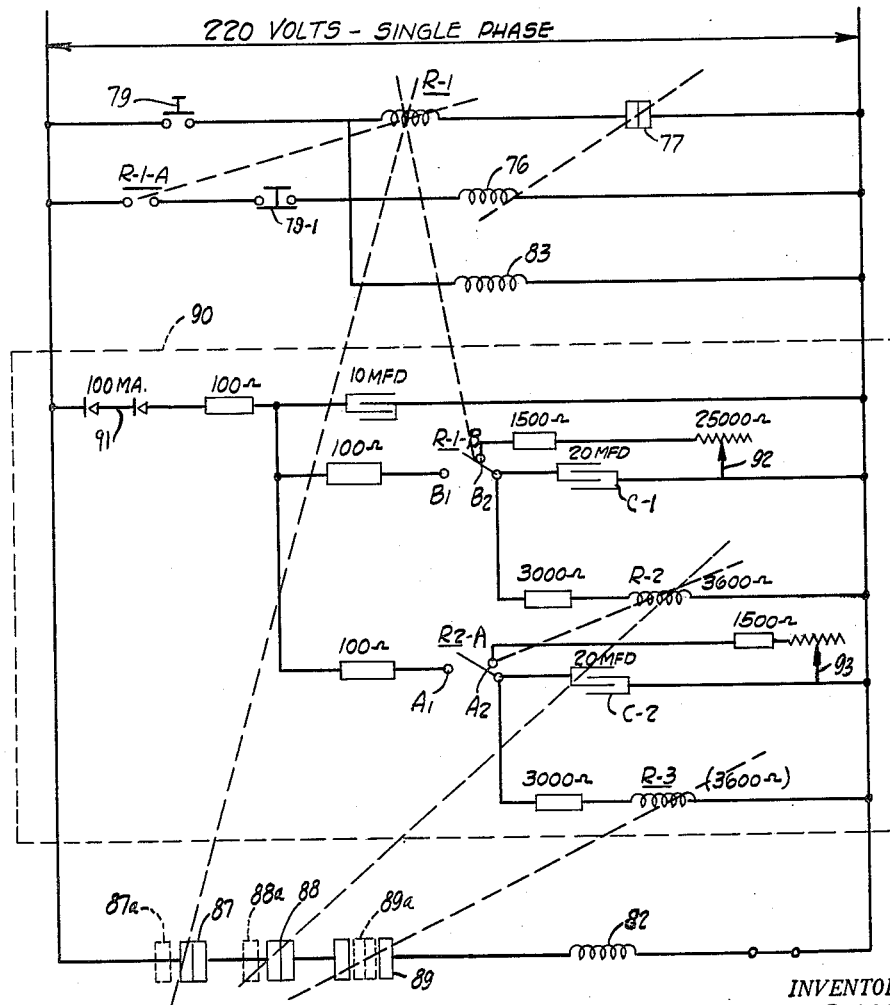

Patented May 18, 1954

2,678,656

UNITED STATES PATENT OFFICE 2,678,656

AUTOMATIC QUENCHING DEVICE

Robert E. Palmer, Rocky River, Ohio, assignor to The Palmer Manufacturing Company, Cleveland, Ohio Application December 18, 1952, Serial No. 326,703

4 Claims. (Cl. 134—58)

My invention relates to quenching devices and has particular reference to devices or apparatus for quenching of heated objects for their hardening.

Conducive to a better understanding of this invention, it may be well to point out that it is often necessary to limit the hardened area of an object, such as a bullet forming die, wherein the cutting edge around the hole must be very hard while the rest of the die should preferably remain relatively soft to avoid cracking of the die in service. Furthermore, it may be pointed out that the length of the quenching period is usually highly critical. Small variations in the duration of the quench results in wide variations in the hardness produced. This is especially true in the case of bullet dies, with which I am especially concerned, and ordinarily requires that the process be attended by a trained metallurgist or a workman of long experience, if an excessive number of rejects is to be avoided. Even with experienced personnel the percentage of rejects is high due to the human element involved when the quenching time is determined by reliance upon change of color and appearance of the die being quenched.

The primary object of this invention, therefore, is to provide a quenching machine that will quench a heated steel die at its cutting edge only, leaving the remainder of the die unquenched and relatively soft.

Another object is to provide apparatus in which the heated die blank is engaged at its hole with a closed circuit of quenching liquid which passes through the die hole from below, whereby only the cutting edges of the die are hardened.

Another object is to provide a device of the type stated that will automatically regulate and time the flow of the quenching liquid so that all pieces are uniformly hard at their cutting edges.

Still another object is to provide a device that will automatically eject the hardened die from its hole quenching table upon completion of the quenching cycle.

A further object is to provide a machine that will automatically cut off the flow of quenching liquid a predetermined time before the die is ejected from the quenching table thereof.

A further object is to provide a machine of the type stated that will automatically quench a die cutting edge to a predetermined hardness upon the pressing of a single button, thereby making it possible to produce perfectly hardened dies with unskilled labor.

Still other objects are to provide such a quenching machine that is portable, self-contained, rugged in structure and reliable in operation.

These and other objects of the invention will become apparent from a reading of the following specification and claims, together with the accompanying drawings, wherein:

Figure 9 is a side elevation of the machine with portions broken away to show the relative position of the parts;

Figure 10 is a right end view of the same;

Figure 11 is a schematic diagram of the electric timing apparatus which controls the quenching cycle; and Figure 12 is a vertical sectional view through the quenching table showing its position relative to the work-piece during the time the quenching fluid is flowing therethru.

Figure 1:
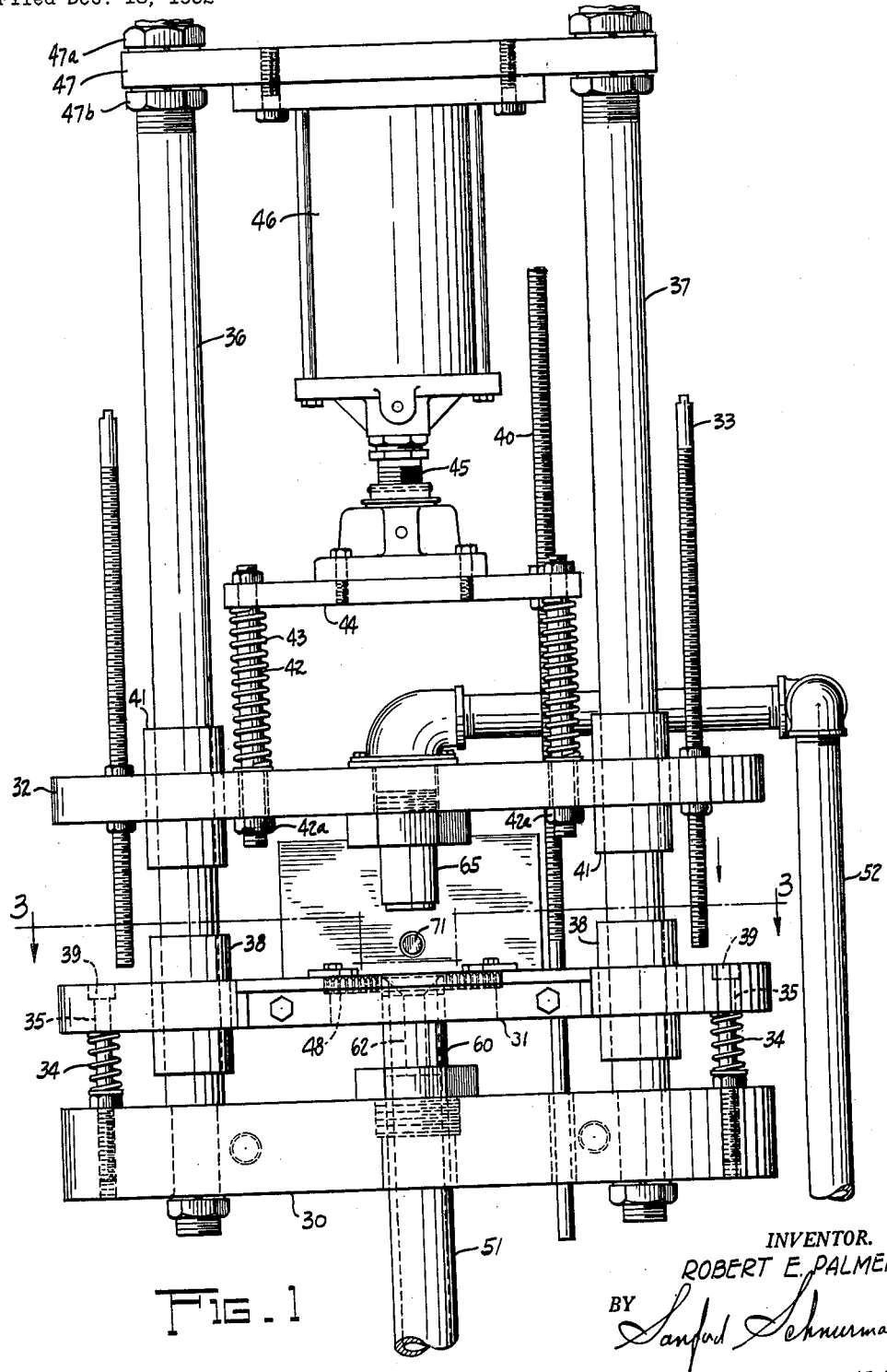
Figure 1 is a front elevation of the quenching table and work clamping cylinder.

Referring more particularly to the drawings, there is seen in Figure 9 a side elevation of the self-contained portable automatic quencher that is the subject of this invention. It comprises an angle iron frame 24 mounted on rollers 25 and includes vertical legs 23 which support a tank 20 containing liquid coolant. The tank 20 is divided into two compartments by a partition wall 21. A removable wire basket 53 is positioned in one compartment for the purpose of receiving the hardened pieces as they are ejected from the quenching table 31. A splash shield 27 is provided to catch water disturbed by the quenched objects as they drop into the basket. The partition 21 has holes 22 in the upper portion thereof which maintain the height of the water in the basket compartment constant and drain excess water back into the second or reservoir compartment.

Two spacer vertical posts 36 and 37 are rigidly secured to the tank frame. A stationary or lower table 30 is rigidly secured to the posts 36 and 37 and the frame of the tank as shown in the Figures 1 and 2.

A quenching table 31 is slidably mounted on the posts 36 and 37 by means of bushings 38. The quenching table 31 is supported in spaced relation above the base table 30 by means of coil springs 34 which are mounted on the vertical studs 35 whose heads 39 engage counter-bored holes in the table 31 to limit the upward movement of the table 31 by the springs 34.

An air ram 46 is suspended between the posts 36 and 37 from a beam 47 that is rigidly locked to the posts by means of lock nuts 47a and 47b. This construction permits vertical adjustment of the ram 46 to enable the machine to accommodate dies of different height. A saddle 44 is attached to the ram piston rod 45. An upper table 32 is slidably mounted on the posts 36 and 37 by means of sleeves 41. The upper table 32 is suspended from the ram saddle 44 on four dependent rods 42 which threadedly engage the saddle 44 but pass through bearing holes in the table 32. The table 32 is supported on the rod ends by the nuts 42a. The table is pressed against the nuts 42a by heavy coil springs 43 which act to cushion the downward thrust of the ram saddle 44. Two push rods 33 at either end of the top table 32 press against the spring suspended sub-table 31 when the ram is activated as explained hereinafter.

Figure 3:
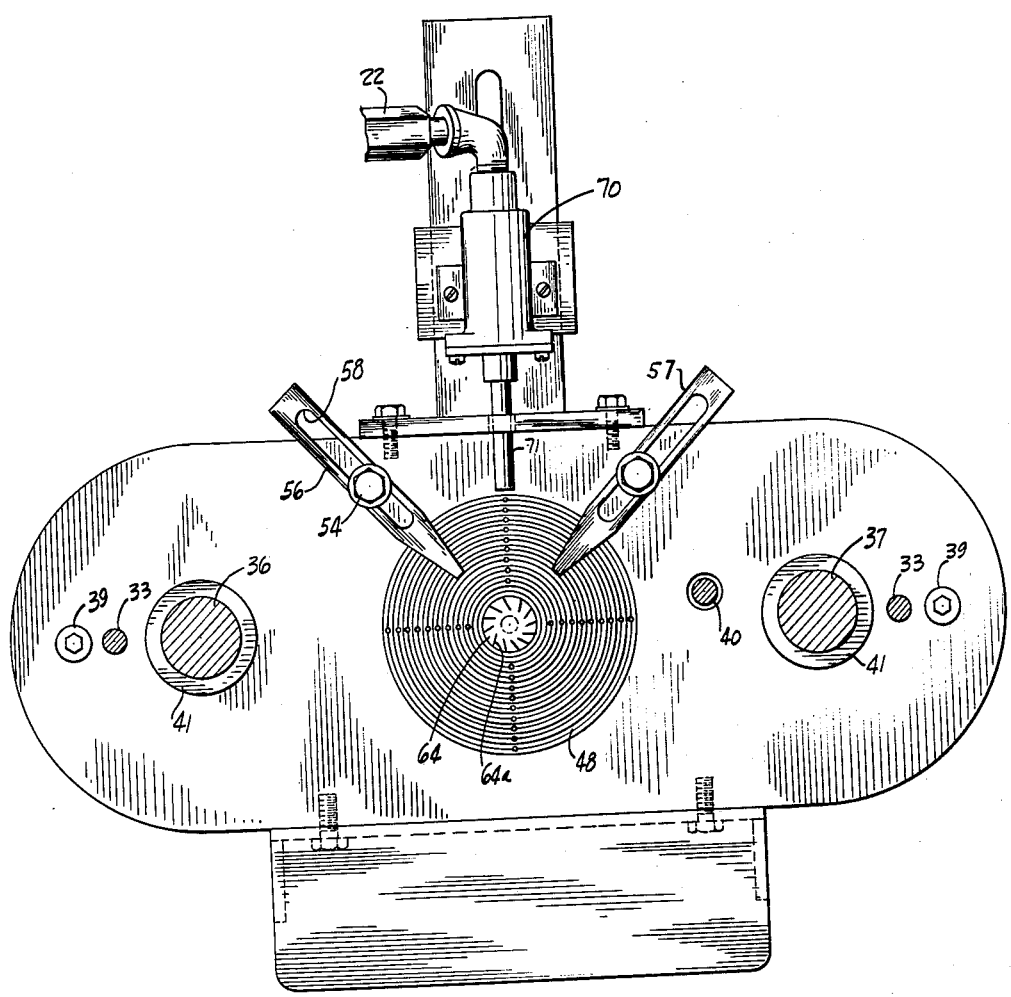
Figure 3 is a view taken along the line and in the direction of the arrows 3—3 of the Figure 1.
Figure 4:
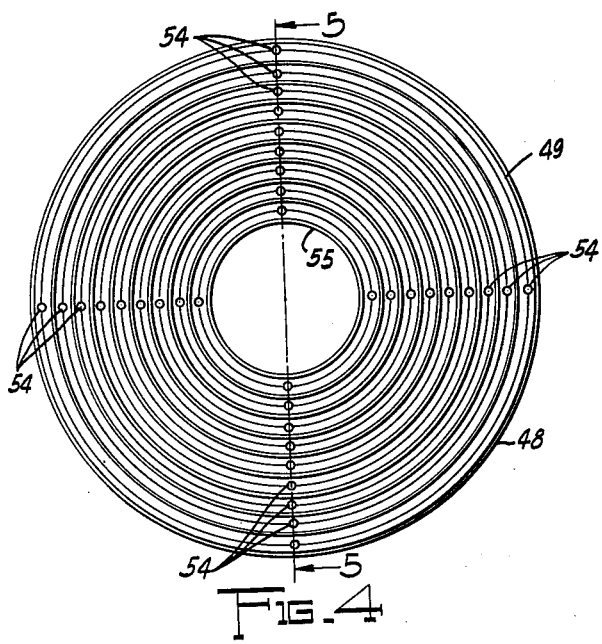
Figure 4 is a top plan view of the die plate.
Figure 5:
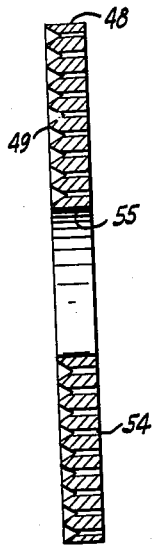
Figure 5 is a sectional view of the die plate taken along the line and in the direction of the arrows 5—5 of the Figure 4.

A die plate 48 is located in the center of the quencher table 31 as is seen most clearly in the Figure 3. The die plate 48 has a central hole 55 therethru with a series of concentric drainage grooves 49 therearound. There are four drainage holes 54 intersecting the bottom of each groove to permit the escape of any water trapped in the grooves.

A coolant injection nozzle 60 is positioned on the base 30 in axial alignment with the quencher plate hole 55, and slidably interfits said hole. The top edge of the nozzle 60 is slightly below the plane of the quencher plate top when the machine is at rest. The quencher table 31 is slidable downwardly on the posts 36 and 37 against the spring supports 34 to bring the top of the nozzle above the plane of the table 31 when the machine is in its quenching condition.

Figure 6:
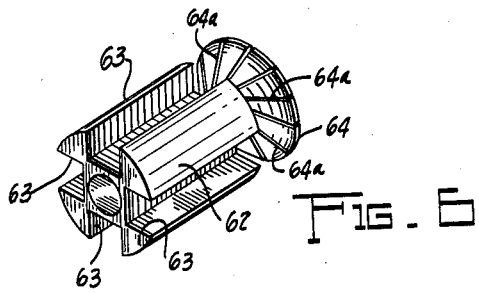
Figure 6 is a perspective view of the water swirl nozzle.
Figure 7:
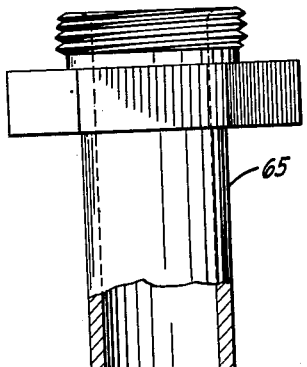
Figure 7 is a side elevation, partly in section, of the top nozzle.
Figure 8:
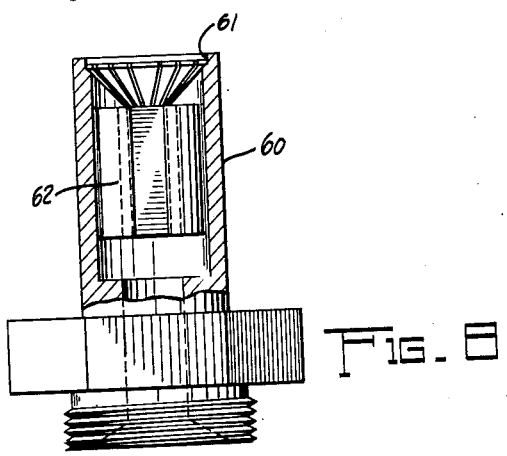
Figure 8 is a side elevation, partly in section, of the bottom nozzle.

A swirler 62 is located within the nozzle 60 as illustrated in Figures 6 and 8, for a function to be hereinafter described. An exhaust nozzle 65 is mounted in the upper table 32 with its vertical axis in alignment with that of the injection nozzle 60 as shown in Figure 1. A pair of locater fingers 56 and 57 are mounted on top of the quencher table 31 by means of bolts 59 located within the finger slots 58. These fingers are adjustable to the shape of the die being quenched and assure precise placement of the bore of each die being quenched relative to the nozzles 60 and 65.

Figure 2:
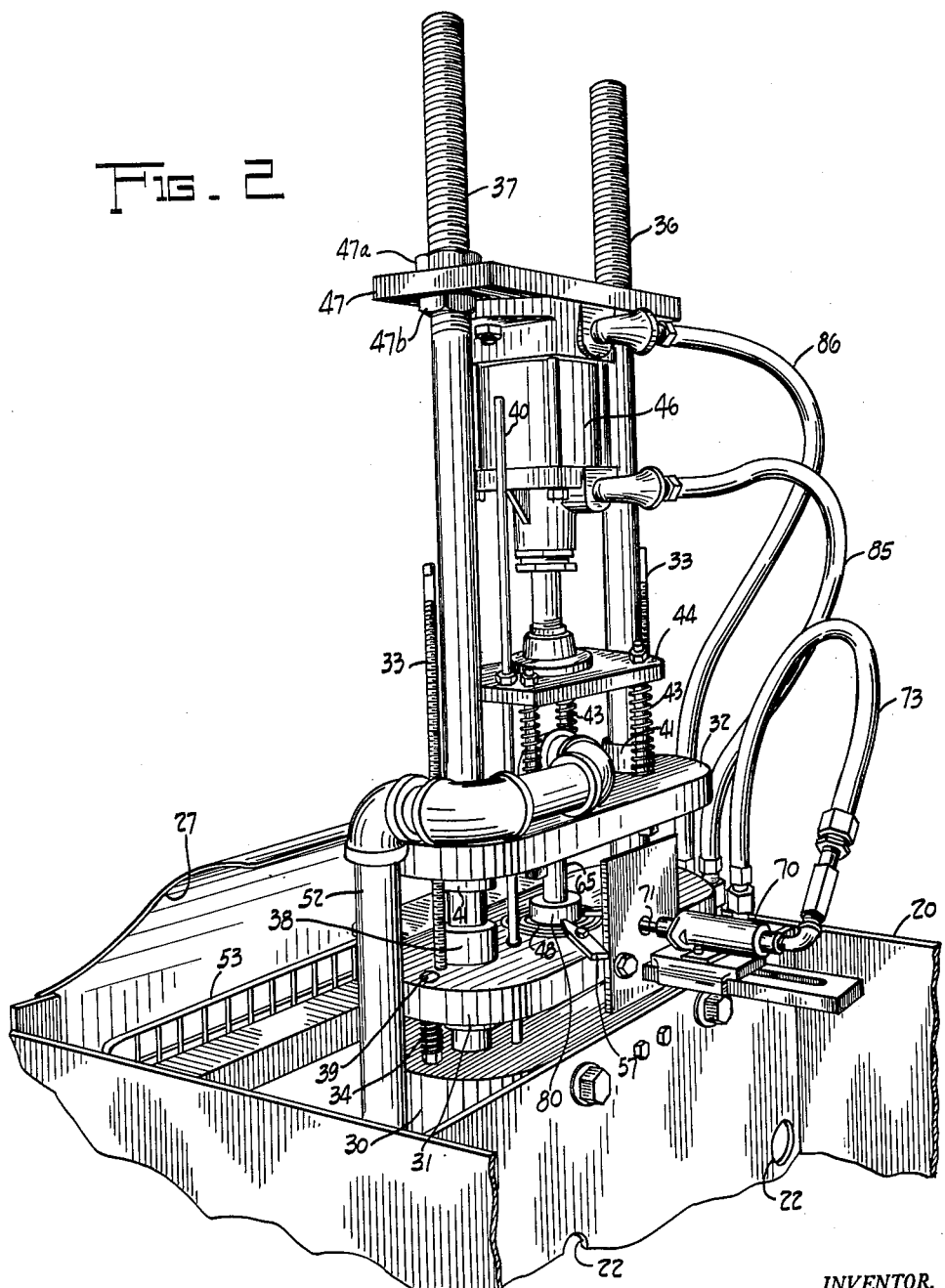
Figure 2 is a perspective view taken from the rear of the table showing a portion of the liquid tank position below the same.

Reference numeral 70 indicates a pneumatic cylinder mounted on the rear of the quenching table 31. The cylinder contains a spring pressed piston having an ejector rod 71 that is normally held in a retracted position by the spring. The ejector rod is located in a plane above and parallel to the upper face of the quencher table 31 as seen in the Figures 1 and 2, and in line with the center line of the quencher plate bore 55 as seen in the Figure 3. Upon the admittance of compressed air into the cylinder 70, the rod 71 is moved out of its housing toward the center hole 55, thereby pushing the quenched die 80 off the table 31 and into the basket 53 as shown in Figure 2.

A pump 28 driven by a motor 29 is located under the tank 20. The pump draws water from the tank 20 through the strainer 67 and intake pipe 26. The pump delivers water under pressure through the discharge pipe 66 to the water control valve 69 which is normally held closed by a self-contained spring and is opened by movement of valve control rod 40. Compressed air from an outside source is connected to the main air line 81 by means of a flexible hose. Electromagnetically operated valves 82 and 83 admit air to the ejector cylinder 70 and the ram cylinder 46. The valve 83 is a 4-way valve which controls the movement of the ram piston and is connected to the ram through lines 85 and 86. The action of the ejector cylinder 70 is controlled by an electromagnetically operated valve 82 which delivers air to the ejector through line 73. The operation of these valves 82 and 83 is controlled by the electrical timing circuit located in the control cabinet 75, and schematically illustrated in Figure 11. The electrical circuits are powered by 220 A. C. current with a capacitance-resistance time-delay system operated by direct current within the area enclosed by the dotted rectangular box 90 in Figure 11. The direct current is furnished by the rectifier 91. The main cycle timer 76 is a synchronous electric clock which operates to open the switch 77 which controls the supply line to the relay R–1 after a set time which may be altered to suit the particular quenching problem at hand.

The automatic quenching of a die such as that identified by the reference numeral 80 in Figures 2 and 12, which has a central die hole 78 therethrough whose surface is to be hardened while leaving the body of the die relatively soft, is as follows:

The die 80 is heated to the proper temperature in the usual manner in a heat treating furnace. The pump 28 is started and pumps water or other suitable quenching fluid contained in the tank 20 under pressure against the valve 69 which is normally closed. A heated die 80 is positioned with its hole 78 centered over the hole 55 in the die-plate 48. The fingers 56 and 57 are adjusted to contact the outer face of the die when the die is properly positioned on the quencher plate, thereby assuring the proper positioning of subsequent pieces of the same run without further attention from the operator. Once the die is positioned, the momentary contact switch 79 is closed by pressing its operating button. This closes the 220 volt A. C. circuit through the closed contact points of the switch 77 and causes the automatic time clock 76 to start, as well as activating the relay R–1 causing its first set of contacts R–1–A to close, thereby maintaining the A. C. supply after the momentary contact switch 79 has been released. At the same time, switch 87 also mechanically controlled by relay R–1 is moved to its open position 87a. A third switch R–1–B, mechanically controlled by relay R–1 is also closed, completing the D. C. circuit which activates relay R-2. The relay R-2 is mechanically connected to switch 88 which is thereupon moved to its open position 88a. A second switch R-2-A also mechanically connected to relay R-2 closes a D. C. circuit which activates relay R-3. Relay R-3 is mechanically connected to switch 89 whose contact points are thereupon closed to take the position indicated by reference numeral 89a. Switches 87, 88 and 89 are connected in series and form a part of the circuit controlling the operation of the magnetic valve 72 which controls the ejector cylinder 70 whose action occurs at the end of the quenching cycle and will be described hereinafter. The sequence of relay energizations just described occurs almost instantaneously and at the same time the pressing of the button 79 activates the magnetic air valve 83, opening it to deliver air to the top side of the piston in the air ram 46 through the hose 86. The piston rod 45 moves downward with its attached saddle 44 and upper table 32. The upper table supporting the exhaust nozzle 65 moves downward on the posts 36 and 37 until the nozzle 65 is pressed firmly against the upper face of the die 80 as shown in the Figures 2 and 12. At the same time, the push rods 33 depending from the table 32 come into contact with the upper surface of the quencher-table 31. The length of the push rods is such that they will contact the table 31 an instant before the nozzle 65 contacts the die 80. The push rods 33 bear against the table 31 and press it downward against the thrust of the springs 34 so that the die is no longer supported by the table 31 but rests solely on the upper edge of the injection nozzle 60, and is compressed between the nozzles 60 and 65 as shown in the Figure 12. Thus a liquid tight seal is created between the nozzles and the die 80 whose hole 78 now forms a part of the coolant flow circuit. The internal diameter of the nozzles being approximately 1/4" larger than the diameter of the die bore 78 so that a hardened area of about 1/8" wide will encircle the hardened bore on the upper and lower surfaces of the quenched die. The width of this face hardened may be varied by correspondingly varying the internal diameter of the nozzles.

The downward movement of the saddle 44 causes a corresponding downward movement of the water-valve rod 40 whose lower end then contacts the water-valve stem 69 which is depressed to admit coolant under pressure to the injection nozzle 60 through the pipe 51 immediately after the nozzles 60 and 65 have been clamped against the die as described hereinabove.

Reference numeral 62 indicates a swirler positioned within the injection nozzle 60. The swirler has a cylindrical body portion that interfits the bore of the nozzle. The body has four longitudinal slots 63 and an inverted frusto-conical head portion 64 having peripheral slots in the face and base end thereof. The head slots 64a are set at an angle of approximately 20° to the central axis of the body and head so that quenching liquid passing through the slots 63 is given a swirling motion upon passing through the head slots 64a. Thus the coolant discharged under pressure from the injector nozzle 60 has a rotary motion which throws it against the wall of the bore 78 in the die 80 instead of passing directly through it in a compact stream as would be the case if a smooth bore nozzle were used. The swirling motion of the water produced by the swirler 62 prevents the formation of an insulating layer of steam between the hot die and the coolant. Thus the die hole 78 is quickly and evenly cooled. Furthermore, a smaller volume of coolant can be used in quenching dies with large holes, since in such cases a stream of water having a hollow center is created which is thrown outward by centrifugal force to cover the hole surface evenly with a layer of coolant.

After passing through the die hole, the coolant leaves through the exhaust nozzle 65 and returns to the tank 20 through the drain pipe 52 whose open discharge end is below the level of the table 30. Thus during the quenching period the die hole 78 is filled with an ever changing volume of quenching fluid which does not have a chance to stagnate and become warmed by the hot die surface. For this reason the quench can be accurately regulated. The passage of a measured volume of fluid for a definite time will always yield dies with uniformly hardened working surfaces. Furthermore, since the quenching fluid is confined within the hole 78, the body of the die is air cooled and remains relatively soft and tough and well able to withstand impact thrusts. The quenching fluid discharged into the tank 20 passes through the strainer 67 and is then returned to the pump 28 through the pipe 26 for recirculation.

At the end of the quenching period, the timing clock 76 operates to open its switch 77 breaking the circuit to the relay R-1. The de-energized relay R-1 thereupon mechanically opens the switches R-1-A and R-1-B, and closes switch points 87. The opening of switch R-1-A causes the magnetic 4-way air valve 83 to deliver air to the ram through line 85 which causes air to flow into the ram cylinder below the saddle bearing piston, thereby causing the piston rod 45 and saddle 44 to rise carrying the table 32 upward. The upward motion of the valve rod 40 mounted on the table 32 closes the quenching fluid valve 69 cutting off the flow of liquid. Fluid remaining in the die hole 78 and the exhaust nozzle 65 is drawn upward and discharged into the tank 20 through a siphon action in the discharge pipe 52. Thus little or no fluid will fall back on the die-plate 48 when the die is released. Any fluid that should fall back is returned to the tank 20 through the drain holes 54. Release of pressure on the quenching table 31 upon upward movement of the push rods 33 permits the springs 34 to return the table 31 to its normal position wherein its quenching plate 48 again supports the die 80. After the saddle has carried the table 32 upward to a position wherein the exhaust nozzle 65 is clear of the upper surface of the die 80, the die is ejected from the table 32 and driven into the basket 53 by a sharp blow from behind by the ejector rod 71. It will be evident that the activation of the ejector cylinder 70 must be delayed a sufficient time after the timer clock opens the switch 77 to permit the preceding series of events to occur. This time delaying action can be carried out in a number of ways but the capacitance-resistance system illustrated in the Figure 11 has been found to be very satisfactory for delaying intervals of up to two seconds which is ordinarily sufficient.

The opening of the switch R-1-B, caused by the de-energization of relay R-1, breaks the circuit of relay R-2 which thereafter is dependent for its energy on the electricity stored in the condenser C-1. The 20 mfd. condenser C-1 stores sufficient electricity to keep the relay R-2 energized for approximately two seconds. This period can be shortened by use of the variable resistance 90 which is connected across the condenser by the closing of switch points R–1–B₂ at the time R–1–B is opened. After the condenser C–1 is discharged, the relay R–2 is de-energized and thereupon mechanically opens switch R–2–A, thereby breaking the power supply to relay R–3 which thereafter receives its energy solely from the condenser C–2. The discharge time of condenser C–2 can be varied by the resistance 93. At the same time the relay R–2 was de-energized it also operated to mechanically close switch contacts 88 in the A. C. line of the magnetic valve 82 controlling the air line 73 connected to the kick-off ejector cylinder 70.

Referring to the Figure 11 and the previous condition of this circuit, as described above, it will now be seen that switches 87, 88 and 89a are all closed. This energizes the magnetic valve 82 and causes the air cylinder 70 to move the ejection rod 71 sharply against the die 80, causing it to move off the table 31 and fly through the air and into the basket 53 which is positioned to catch the die. The ejector rod is held in its extended position until the condenser C–2 discharges, whereupon the relay R–3 becomes de-energized and mechanically moves the switch 89a to its open condition 89. This breaks the electrical circuit of valve 82, cutting off the air supply to cylinder 70. The ejector rod 71 then retracts within the cylinder 70 under the action of a spring which normally biases the rod inwardly of the cylinder 70. Adjustment of the rheostat 93 determines the length of time that the ejector rod 71 remains extended. Thus activation of the ejector rod 71 is delayed a time sufficient to permit the nozzles and accessory structures to release the die 80 before it is hit by the ejection rod and removed from the table 31.

The body of the die 80 is quenched after entering the wire basket 53 by the quenching fluid in which it is immersed, as seen in Figure 9. A die quenched by this device will have a hardened hole surface 78a, as seen in Figure 12, and a relatively soft body portion. Once the machine and timing mechanism is set up for a particular operation, it is possible to automatically repeat the quenching cycle by merely pressing the starter switch 79. Unskilled labor can therefore be employed to place the heated die on the table 31 and obtain perfectly hardened dies with few or no rejects. The difference in hardness between the hole area of the die and the body can be controlled by varying the time between the moment the quenching liquid valve 69 is closed and the time the ejector is activated to throw the die into the liquid filled basket 53. The time delay circuit 90, described, will give a maximum delay of approximately two seconds, a longer delay would require a different circuit, several of which are well known to those skilled in the art.

In adapting the machine to objects of different physical characteristics, the amount of pressure or squeeze exerted by the ram 46 can be varied by suitable adjustment of the air pressure regulator valve 84. The time of the quench can be varied within wide limits by setting the dial of the timing mechanism 76.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A die hole quencher, comprising in combination, a pair of spaced upright post members, a table for supporting a die slidably mounted on said posts, the said table having a quencher hole therethru, an injection nozzle mounted below the table and having its venting end positioned within the quencher hole and normally flush with the upper surface of the table, a discharge nozzle slidably mounted on the posts above the table and having its intake end in alignment with the center of the quencher hole and injection nozzle, means for moving said discharge nozzle downward toward the injection nozzle to engage the upper face of a die resting on the table at its hole, means for simultaneously moving the table downward out of supporting engagement with the lower face of the supported die, whereby the upper surface of the table lies in a plane below the venting end of the injection nozzle and the die is clamped at its hole between the ends of the injection and discharge nozzles, means for forcing quenching fluid through the injection nozzle, from below, through the die hole and discharge nozzle, timing means for automatically cutting off the flow of fluid at the end of a predetermined time interval, and means for removing the quenched die from the table at the end of the quenching period, activated by said timing means after it has cut off the flow of quenching fluid.

2. A device of the type defined in claim 1 and further characterized by the injection nozzle having swirling means therein whereby the quenching fluid passing therethrough is given a circular motion which throws it against the walls of the die hole.

3. A die hole quencher, comprising in combination, a base including a tank for holding a quantity of quenching fluid; a pair of spaced upright posts mounted on the base; a table for supporting a die slidably mounted on said posts above the tank, the table having a quencher-hole therethru; an injection nozzle mounted below the table having its delivery end positioned within the quencher-hole and normally flush with the upper surface of the table, the said nozzle being provided with a control valve connected to a pump mounted on the base which delivers quenching fluid under pressure from the tank; an air ram mounted on the posts proximate the upper ends thereof; an exhaust nozzle slidably mounted on the posts above the table connected to the end of the ram piston rod and having a vent discharging into the tank below the level of the table, the center of the intake end of the exhaust nozzle being in alignment with the center of the quencher-hole and the injection nozzle, the said exhaust nozzle being movable by the ram piston rod between a first position, wherein the intake end of the exhaust nozzle is spaced from the top surface of a die supported by the table, and a second position wherein its intake end is in pressed, liquid tight, engagement with the top surface of the die at its hole; depressor means mounted on the exhaust nozzle operable to depress the table below the plane of the delivery end of the injection nozzle when the exhaust nozzle is in its second position, thereby leaving the die clamped between the two nozzle ends and unsupported by the table; valve control means associated with the exhaust nozzle which act to close the injector nozzle valve when the exhaust nozzle is in its first position and to open the said valve to deliver quenching fluid under pressure to the injection nozzle, die hole and exhaust nozzle, when the exhaust nozzle is in its second position; electrically operated timing means connected to the air ram to activate the air ram to automatically move the exhaust nozzle from its second to its first position after a predetermined time interval; and means for ejecting the die from the table immediately after the discharge nozzle is returned to its first position.

4. A device of the type defined in claim 3 and further characterized by the injection nozzle having swirling means therein whereby the quenching fluid passing therethrough is given a circular motion which throws it against the walls of the die hole.

References Cited in the file of this patent

UNITED STATES PATENTS

| Number | Name | Date |
|---|---|---|
| 904,300 | Bimmerle | Nov. 17, 1908 |
| 1,513,974 | Ehn | Nov. 4, 1924 |
| 1,766,208 | Anstiss | June 24, 1930 |
| 2,141,081 | Davenport | Dec. 20, 1938 |
| 2,176,845 | Temple | Oct. 17, 1939 |
| 2,596,493 | Linney | May 13, 1952 |